(12) United States Patent  
Plummer et al.

(10) Patent No.: US 6,978,448 B1
(45) Date of Patent: Dec. 20, 2005

(54) METHOD AND APPARATUS FOR REWRITING BYTECODES TO MINIMIZE RUNTIME CHECKS

(75) Inventors: Christopher J. Plummer, San Martin, CA (US); Nedim Fresko, San Francisco, CA (US); Richard D. Tuck, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 676 days.

(21) Appl. No.: 09/841,759

(22) Filed: Apr. 24, 2001

Related U.S. Application Data

(60) Provisional application No. 60/211,033, filed on Jun. 12, 2000.

(51) Int. Cl.$^7$ ................................. G06F 9/45
(52) U.S. Cl. ...................................... 717/140
(58) Field of Search .................. 717/126, 159, 717/137–148; 714/37

(56) References Cited

U.S. PATENT DOCUMENTS

| | | | |
|---|---|---|---|
| 5,890,176 A | | 3/1999 | Kish et al. ................. 707/511 |
| 6,061,520 A | * | 5/2000 | Yellin et al. ............... 717/148 |
| 6,330,709 B1 | * | 12/2001 | Johnson et al. ............ 717/100 |
| 6,349,344 B1 | * | 2/2002 | Sauntry et al. ............. 719/332 |
| 6,484,188 B1 | * | 11/2002 | Kwong et al. .............. 707/206 |
| 6,658,421 B1 | * | 12/2003 | Seshadri .................... 707/100 |
| 6,691,307 B2 | * | 2/2004 | Long ......................... 717/159 |

FOREIGN PATENT DOCUMENTS

| | | | |
|---|---|---|---|
| EP | 0778521 A2 | 12/1996 | ............ G06F 9/45 |
| EP | 0949566 A2 | 10/1999 | ............ G06F 9/45 |

OTHER PUBLICATIONS

Sun Microsystems Inc., "PersonalJava 1.1 Application Environment memory Usage Technical Note", Jul. 1998, Sun Microsystems Inc.*

International Search Report from corresponding PCT application PCT/US01/17823 mailed Sep. 11, 2003.

* cited by examiner

*Primary Examiner*—Wei Y. Zhen
(74) *Attorney, Agent, or Firm*—Beyer Weaver & Thomas, LLP

(57) ABSTRACT

Methods and apparatus for reducing the number of runtime checks performed during the execution of a virtual machine. According to one aspect of the present invention, a computer system includes a preloader, a compiler, and a virtual machine. The preloader is arranged to determine whether a bytecode makes an active reference to a class which requires an execution of a static initializer, and is also arranged to determine if the class has a superclass which requires the execution of the static initializer. The compiler is arranged to accept a source file generated by the preloader as input and to produce an object file, and the virtual machine is arranged to execute the object file.

13 Claims, 4 Drawing Sheets

METHOD AND APPARATUS FOR REWRITING BYTECODES TO MINIMIZE RUNTIME CHECKS

CROSS REFERENCE TO RELATED APPLICATION

This application takes priority under U.S.C. 119(e) of U.S. Provisional Application No. 60/211,033 filed Jun. 12, 2000 entitled, "METHOD AND APPARATUS FOR REWRITING BYTECODES TO MINIMIZE RUNTIME CHECKS" by Plummer et. al. which is incorporated by reference in its entirety.

BACKGROUND OF THE INVENTION

1. Field of Invention

The present invention relates generally to improving the performance of virtual machines. More particularly, the present invention relates to rewriting bytecodes to substantially eliminate redundant checks on the state of a class and type checks.

2. Description of the Related Art

A conventional implementation of the Java™ programming language developed by Sun Microsystems, Inc. of Palo Alto, Calif., is a Java™ virtual machine which includes a byte-code interpreter. A conventional virtual machine reads in and executes bytecodes, as will be appreciated by those skilled in the art. When executing dynamically loaded classes, optimizations are often made to the bytecodes during execution in order to enable the bytecodes to execute faster the next time they are executed.

In some systems, Java™ classes may "preloaded" into read only memory (ROM) such that optimizations or rewrites to bytecodes are made statically before execution of a virtual machine begins. Within such systems, the runtime representation of a class that is used by the virtual machine is preloaded into ROM. For a class file to be preloaded, the class file is first processed by a tool, e.g. a preloader, that is capable of converting the class file into a runtime representation of the class that is suitable for the virtual machine. The preloader takes care of substantially any bytecode optimizations or rewrites that the virtual machine would typically perform at runtime for dynamically loaded classes.

Generally, a virtual machine is responsible for executing the "<clinit>" method of a Java™ class. The "<clinit>" method of a Java™ class is typically generated by a Java™ compiler to initiate static variables, and may be considered to be a static initializer. A static initializer is arranged to set aside memory to store a static variable. By way of example, a static initializer called with respect to a class "MyClass" may be arranged to set aside memory to store static variables associated with class MyClass. Specifically, class MyClass may be defined as follows:

```
Class MyClass {
    static int x = 5
}
```

For class MyClass, the static initializer generated by a compiler initializes a static variable to store the value "5." That is, the static initializer initializes previously allocated memory to store the value associated with "x."

FIG. 1 is a diagrammatic representation of a system which includes a preloader and a virtual machine. A system 110 includes a Java™ compiler 114, a preloader 118, a C compiler 122 which compiles files written in the C programming language, and a virtual machine 126. Compiler 114 takes as input a Java™ source file written in the Java™ programming language, e.g., MyClass.java, and compiles the file into a class file, e.g., MyClass.class. The class file is inputted to preloader 118, which may be a Java™ Code Compact developed by Sun Microsystems, Inc. of Palo Alto, Calif. Preloader 118 creates a source file, e.g., a ramjava.c file, for compiler 122, that contains data structures which are used by virtual machine 126. Preloader 118 also sets aside memory to store static variables. Compiler 122 compiles source files generated by preloader 118 into object files, e.g., a romjava.o file. The object files are provided to virtual machine 126 as preloaded files, along with standard virtual machine object files, e.g., a vm.o file, such that virtual machine 126 may execute the files.

A virtual machine typically executes the "<clinit>" method of a Java™ class the first time an "active" reference is made to the class. An active reference is generally a reference which refers to a static variable. In addition, creating an instance of a class may be an example of an active reference. Active references are described in *The Java™ Virtual Machine Specification* by Tim Lindholm and Frank Yellin (ISBN 0-201-63452-X), which is incorporated herein by reference.

An active reference to class MyClass would cause "x" to be initialized to store the value "5." In some cases, an active reference to a class may cause a call to a method of the class to be made. As such, each time an active reference to a class is made, a check of the class is substantially required to determine if the "<clinit>" method has already been run.

Due to performance issues, most Java™ virtual machines attempt to reduce the number of checks made to determine if the "<clinit>" method has been run more than once for a given bytecode. One standard method used to reduce the number of checks made involves modifying the bytecode used to make the active reference so that the next time the bytecode is executed, no check needs to be made. For example, the "new" bytecode may be changed to the "new_quick" bytecode. By changing the "new" bytecode to the "new_quick" bytecode, the need for the "new_quick" bytecode to check if the "<clinit>" method of the class has been run may be eliminated because it is known by the existence of the "new_quick" bytecode that the "<clinit>" has already been run.

However, in Java™ virtual machine environments where Java™ classes are preloaded into ROM, the bytecode that caused an active reference may not be modified. This means the check to see if the "<clinit>" method was run is made every time a bytecode that makes an active reference to a class is executed. For example, a preloaded class would already have all "new" bytecodes changed to "new_quick" opcodes. However, "new_quick" opcodes would substantially always have to check to see if the "<clinit>" method for a class has been run because "new_quick" is also used for the first active reference to the class. Such checks are generally time-consuming, and unnecessary checks often compromise the efficiency of the virtual machine.

Since checks for a "cinit" method during the runtime of a virtual machine are time-consuming and may be unnecessary, e.g., if a "cinit" method is known to have been executed, avoiding such checks when they are known to be unnecessary may increase the performance of the virtual machine. Avoiding other types of checks during runtime may also increase the performance of the virtual machine. For example, opcodes such as a getfield opcode or a putfield opcode, which get contents of a field from an object and place contents into a field of an object, respectively, may involve obtaining either scalar values or references. A garbage collector may use such commands since it requires knowledge of every reference in a system. However, the use of such commands requires a type check to determine if a field of an object holds a scalar value, e.g., an integer, or a reference. When the contents hold a reference, then a barrier may be implemented, and either a read barrier check or a write barrier check may be performed in the course of a garbage collection. If the contents of a particular field contain a scalar, then a barrier is not implemented, and read and write barrier checks are not performed. If it has previously been determined that the contents of a particular field pertain to a scalar, then always checking the type associated with the contents when a garbage collection is required may compromise the performance the runtime performance of a virtual machine, as such checks may be expensive.

Therefore, what is desired is a relatively inexpensive method and apparatus for reducing the number of runtime checks performed during the execution of a virtual machine. Specifically, what is needed is a method and apparatus for substantially eliminating unnecessary checks for a "<clinit>" method and unnecessary type checks.

SUMMARY OF THE INVENTION

The present invention relates to methods and apparatus for reducing the number of runtime checks performed during the execution of a virtual machine. According to one aspect of the present invention, a computer system includes a preloader, a compiler, and a virtual machine. The preloader is arranged to determine whether a bytecode makes an active reference to a class which requires an execution of a static initializer, and is also arranged to determine if the class has a superclass which requires the execution of the static initializer. The compiler is arranged to accept a source file generated by the preloader as input and to produce an object file, and the virtual machine is arranged to execute the object file. In one embodiment, the preloader also rewrites the bytecode to a new bytecode which indicates that at least one of the class and the superclass requires execution of the static initializer when it is determined that the bytecode makes the active reference to the class which requires the execution of the static initializer.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In the following description, numerous specific details are set forth in order to provide a thorough understanding of the present invention. It will be apparent, however, to one skilled in the art that the present invention may be practiced without some or all of these specific details. In other instances, well known structures or operations have not been described in detail in order to not unnecessarily obscure the invention.

Identifying a bytecode which makes an active reference to a class as requiring a "<clinit>" method to be run enables a virtual machine to execute more efficiently. That is, by causing a check to see if a "<clinit>" method or a static initializer has been run to be made only on bytecodes which are identified as actively referencing a class which requires a "<clinit>" method, unnecessary checks to see if a "<clinit>" method needs to be run may be substantially avoided. The performance of a virtual machine may also be improved by effectively identifying contents of object fields as being either references or scalar values such that the need to perform type checks during a garbage collection may be substantially reduced.

Figure 1:
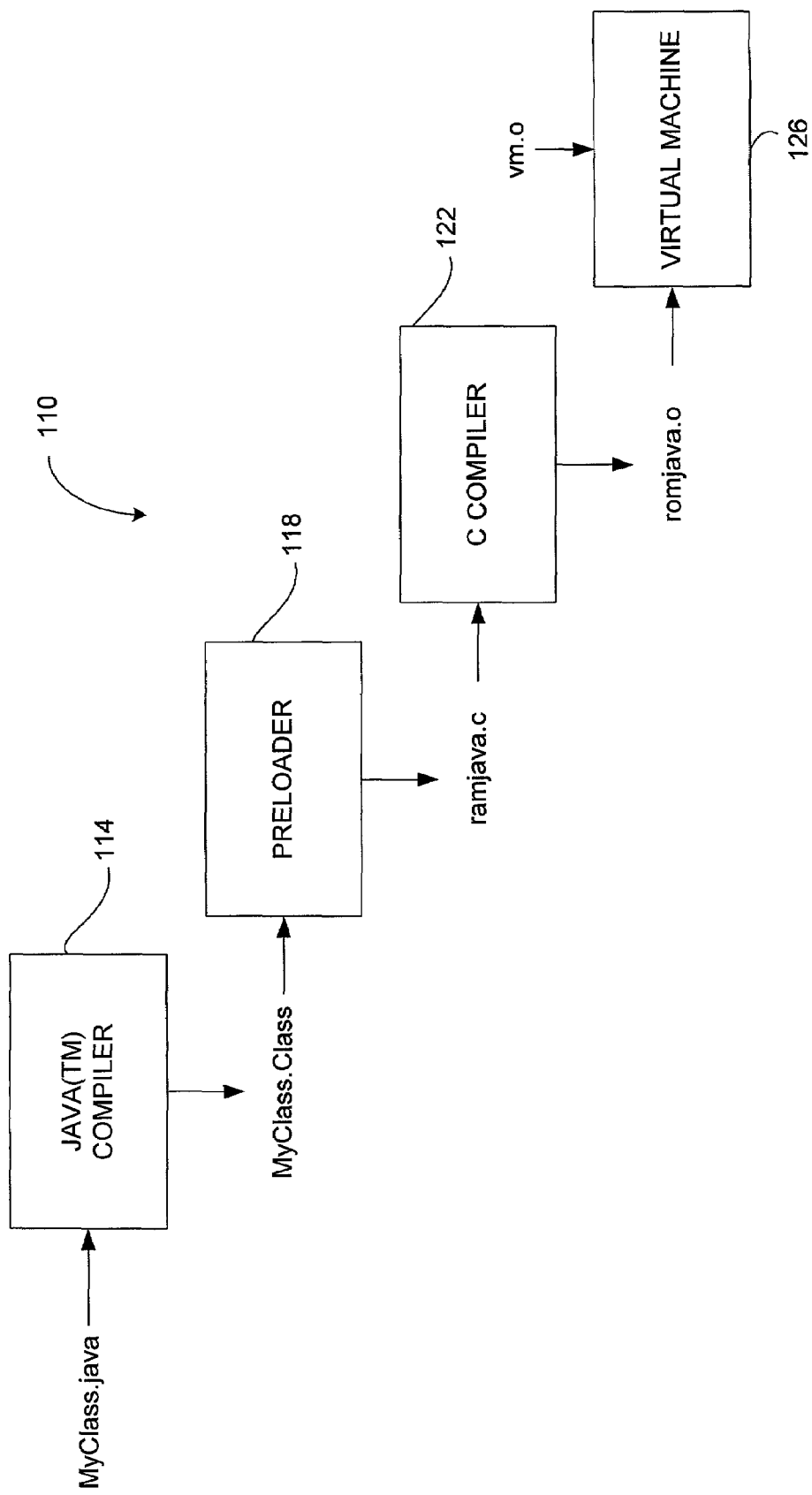
FIG. 1 is a diagrammatic representation of a system that includes a preloader and a virtual machine.
Figure 2:
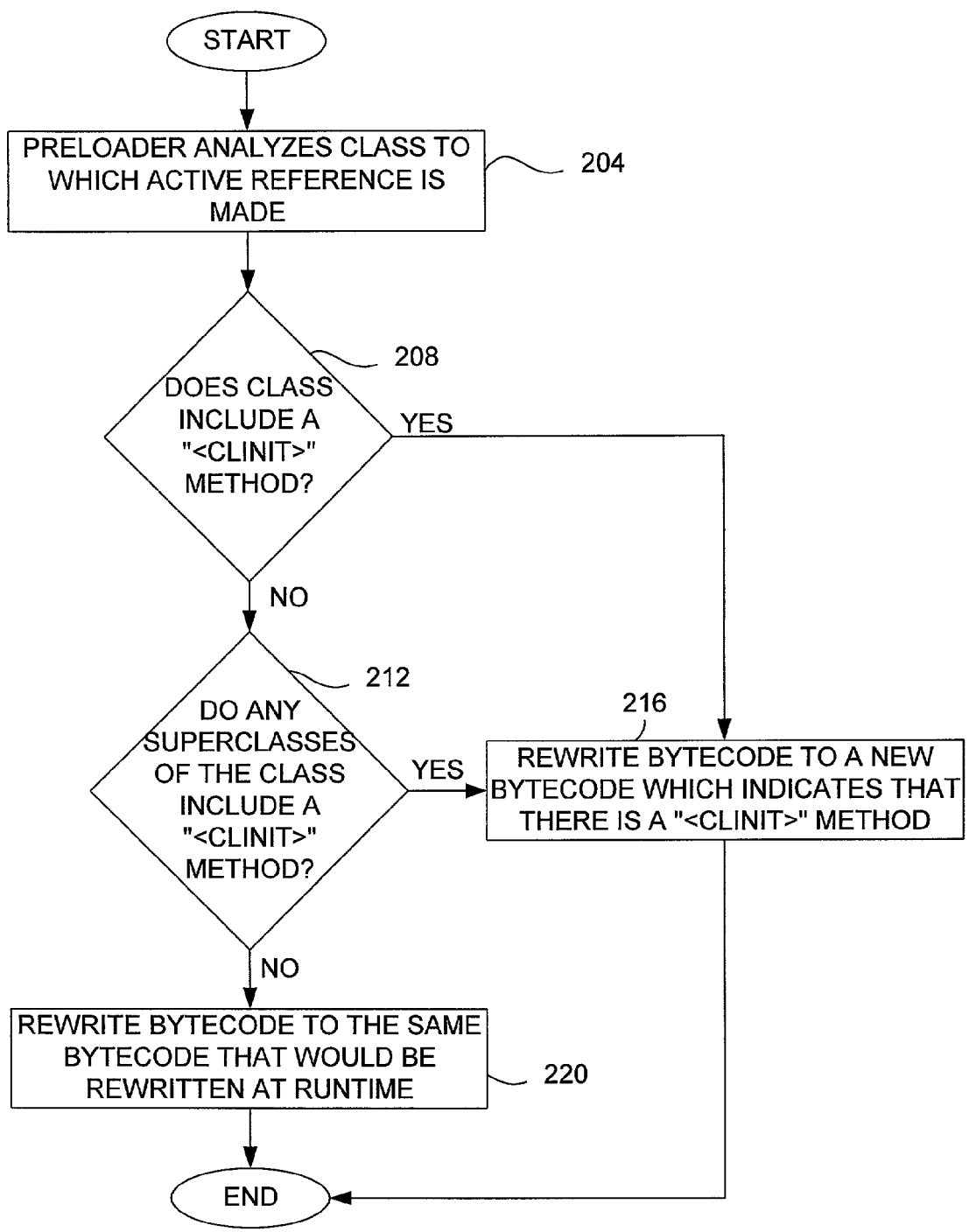
FIG. 2 is a process flow diagram that illustrates the steps associated with rewriting bytecodes in accordance with an embodiment of the present invention.

Referring initially to FIG. 2, the steps associated with rewriting bytecodes will be described in accordance with an embodiment of the present invention. When a bytecode that makes an active reference to a class is to be rewritten, e.g., optimized or "quickened," a preloader such as a Java™ Code Compact developed by Sun Microsystems, Inc., of Palo Alto, Calif. analyzes the class to which the active reference is made in step 204. The analysis of the class is made to determine whether the class or any of its superclasses includes a "<clinit>" method. It should be appreciated that the preloader essentially takes a class file and creates data structures that a virtual machine would use at runtime.

A determination is made in step 208 regarding whether the class has a "<clinit>" method, or otherwise requires a "<clinit>" method to be executed. If it is determined that the class does not have a "<clinit>" method, then process flow proceeds to step 212 and the determination of whether any of the superclasses of the class have a "<clinit>" method. When it is determined in step 212 that none of the superclasses of the class have a "<clinit>" method, then the bytecode is rewritten to the same bytecode that it would normally be rewritten to at runtime. By way of example, a "new" bytecode for the class may be come a "new_quick" bytecode for the class. Once the bytecode is rewritten, e.g., optimized or quickened, then the process of rewriting a bytecode that makes an active reference to a class is completed.

Returning to step 208, if the determination is that the class has a "<clinit>" method, then in step 216, the bytecode is rewritten to a new bytecode which indicates that the class has a "<clinit>" method. In one embodiment, a "new" bytecode for the class may become a "new_checkinit_quick" bytecode which takes a class name as an argument in order to identify the class as having a "<clinit>" method. Similarly, if it is determined in step 212 that any of the superclasses associated with the class includes a "<clinit>" method, then in step 216, the bytecode is rewritten to a new bytecode which indicates that the class or any one of its superclasses has a "<clinit>" method. Once step 216 is executed, the process of rewriting a bytecode that makes an active reference to a class is completed.

In one embodiment, adding a "new_checkinit_quick" bytecode is that the "new_quick" opcode will not have to perform a check to determine if the it is necessary to run a "<clinit>" method. Only the "new_checkinit_quick" opcode would require such a check. By explicitly identifying opcodes which need to be checked to determine if it is necessary to run a "<clinit>" method, and, hence, not requiring "new_quick" opcodes to perform such a check, the number of preloaded bytecodes that check if a "<clinit>" method needs to be run may be significantly reduced.

Although substantially any suitable opcode may be rewritten, the opcodes associated with a Java™ environment which are rewritten include the "new" bytecode, the "invokestatic" bytecode, the "getstatic" bytecode, and the "putstatic" bytecode. In other words, when the opcodes require a check for a <clinit> method, the opcodes may be identified as requiring such a check. For instance, the "invokestatic" bytecode may be identified as a "invokestatic_checkinit_quick" bytecode, the "getstatic" bytecode may be identified as a "getstatic_checkinit_quick" bytecode, and the "putstatic" bytecode may be identified as a "putstatic_checkinit_quick" bytecode. It should be appreciated that each of these bytecodes generally take a class name as an argument in order to identify the class as needing to run a "<clinit>" method at some point.

As mentioned above, by checking to see if a "<clinit>" method has already been run only when an opcode is identified as requiring a "<clinit>" method to be run, many substantially unnecessary checks may be eliminated during runtime. As a result, a virtual machine may execute more efficiently during runtime, thereby improving the overall performance of the virtual machine.

The performance of a virtual machine may also be improved by reducing type checks performed on opcodes such as a "getfield" opcode or a "putfield" opcode. Typically, with respect to a garbage collection performed on memory associated with a virtual machine environment, the execution of "getfield" and "putfield" opcodes use read and write barriers. A "getfield" opcode and a "putfield" opcode each manipulate contents of an object field which may either be references to objects or scalar values, e.g., integers.

A garbage collector requires knowledge of where references are being written to or read from, as will be appreciated by those skilled in the art. Typically, in order to reduce the number of type checks performed by a garbage collector and minimize the effects of read and write barriers, bytecodes may be rewritten, e.g., optimized or quickened. In general, "getfield" may be rewritten to be "getfield_quick" or "agetfield_quick" where "agetfield_quick" identifies the contents of an object field as containing a reference to an object. Similarly, "putfield" may be rewritten to be "putfield_quick" or "aputfield_quick" where "aputfield_quick" identifies the contents of an object field as containing a reference to an object.

By only performing a barrier check on "agetfield_quick" and "aputfield_quick," and not performing a barrier check on "getfield_quick" or "putfield_quick," the number of barrier checks performed during runtime of a virtual machine may be reduced. Further, by not performing type checks to determine if the contents of a field include a scalar or object references, the efficiency of the virtual machine is further increased. In the described embodiment, the need to check the type associated with contents of a field manipulated using "getfield_quick" or "putfield_quick" may be eliminated, as "getfield_quick" and "putfield_quick" are effectively identified as not being associated with object reference fields.

Figure 3:
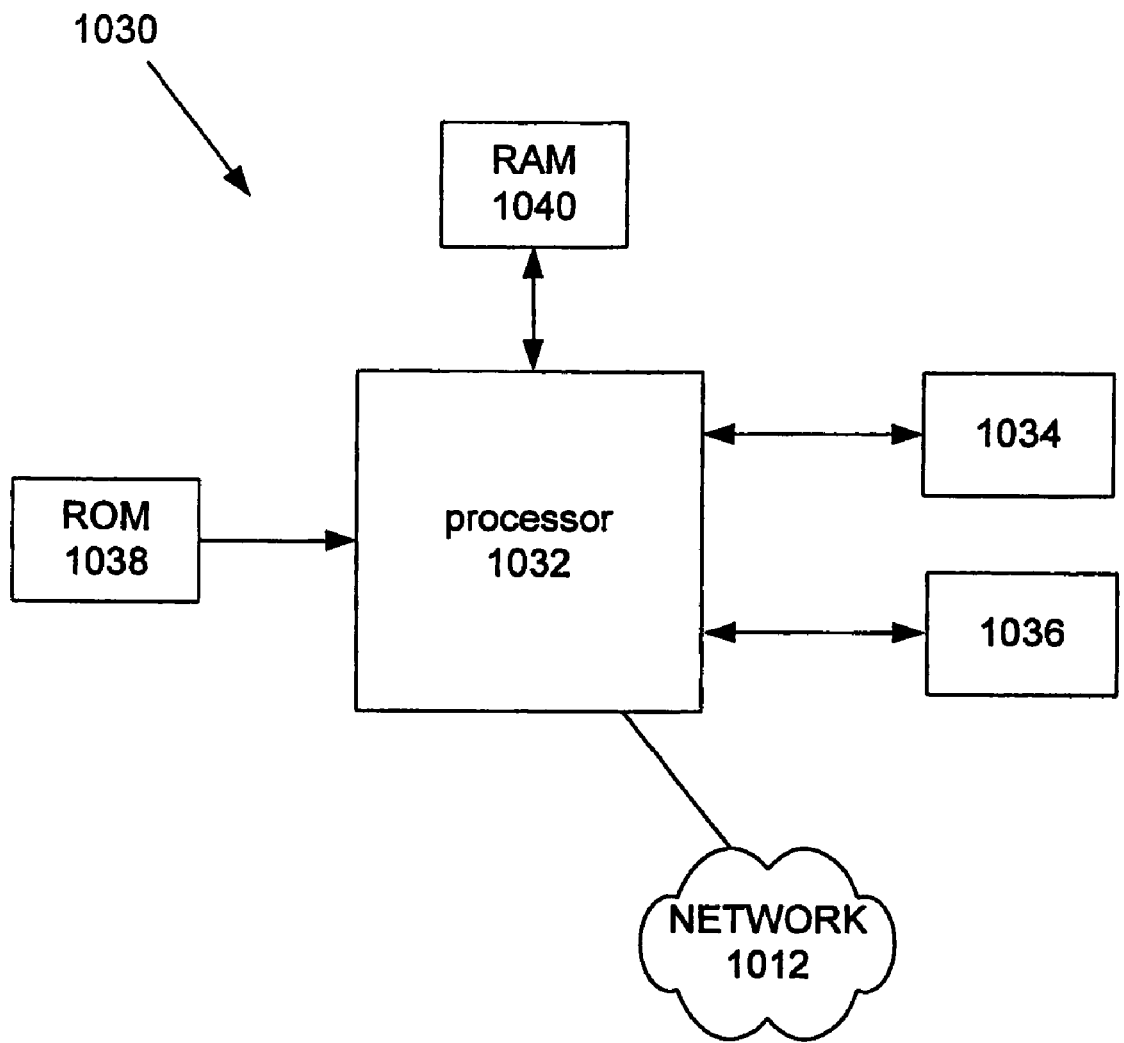
FIG. 3 is a diagrammatic representation of a general-purpose computer system suitable for implementing the present invention.

FIG. 3 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

Computer system 1030 or, more specifically, CPUs 1032, may be arranged to support a virtual machine, as will be appreciated by those skilled in the art. One example of a virtual machine that may be supported on computer system 1030 will be described below with reference to FIG. 4. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 4:
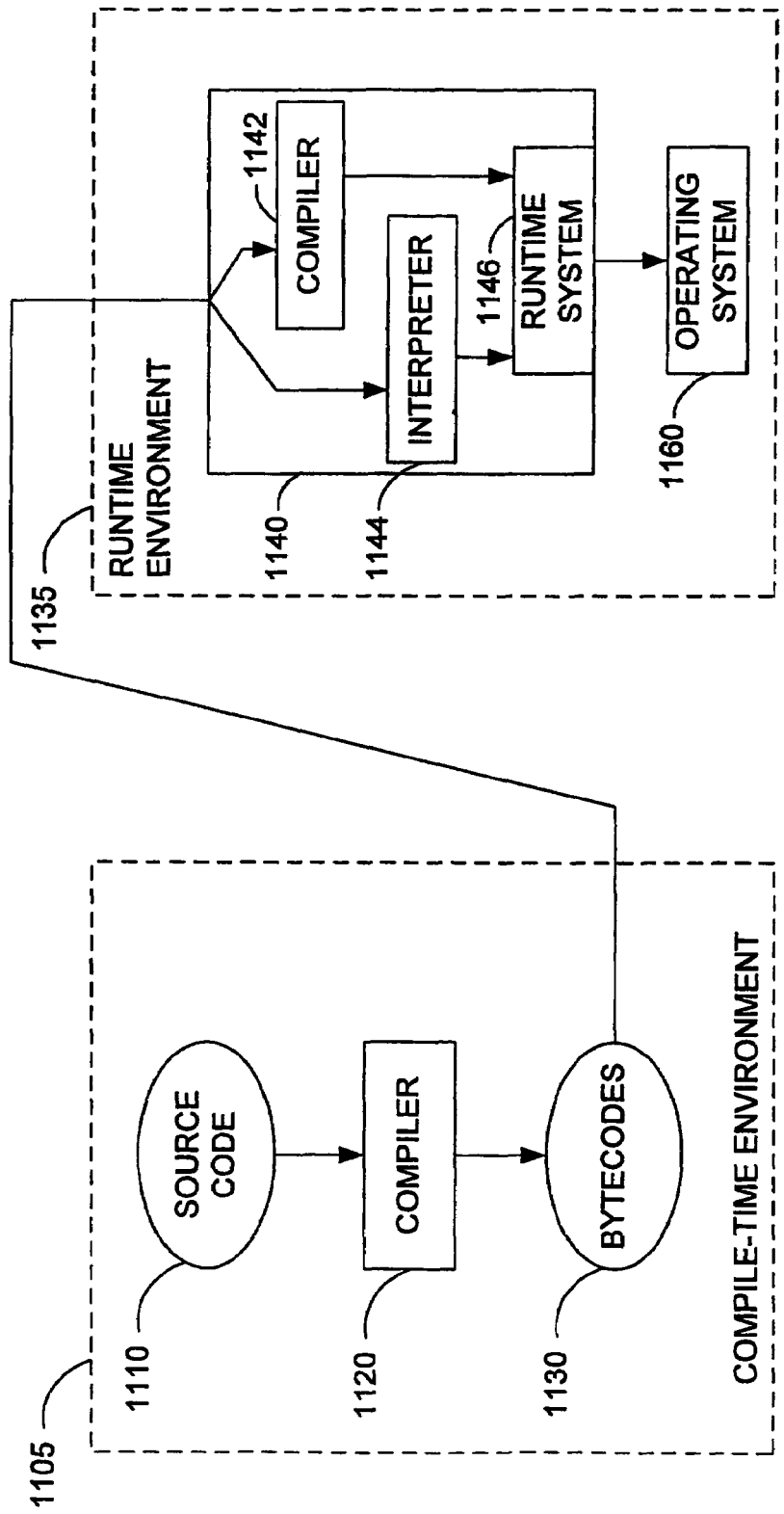
FIG. 4 is a diagrammatic representation of a virtual machine suitable for implementing the present invention.

As previously mentioned, a virtual machine may execute on computer system 1030. FIG. 4 is a diagrammatic representation of a virtual machine which is supported by computer system 1030 of FIG. 3, and is suitable for implementing the present invention. When a computer program, e.g., a computer program written in the Java™ programming language, is executed, source code 1110 is provided to a compiler 1120 within compile-time environment 1105.

Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 3, or stored on a storage device such as primary storage 1034 of FIG. 3. In the described embodiment, bytecodes 1130 are platform independent. That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 3. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Although only a few embodiments of the present invention have been described, it should be understood that the present invention may be embodied in many other specific forms without departing from the spirit or the scope of the present invention. By way of example, although a virtual machine environment has generally been described as being a Java™ virtual machine environment, the present invention may generally be applied to substantially any suitable virtual machine environment. Suitable virtual machine environments may be widely varied and may include a Smalltalk virtual machine environment.

In general, it should be appreciated that the steps associated with the various processes and methods of the present invention may be widely varied. For example, the steps associated with the methods may be altered or reordered. Steps may also be replaced, removed, and added without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer system comprising:
   a preloader arranged to,
      determine whether a bytecode makes an active reference to a class which requires an execution of a static initializer,
      determine if the class has a superclass which requires the execution of the static initializer, wherein the preloader produces a source file,
      rewrite the bytecode to a new bytecode which indicates that at least one of the class and the superclass requires execution of the static initializer when it is determined that the bytecode makes the active reference to the class which requires the execution of the static initializer;
   a compiler coupled to the preloader arranged to accept the source file as input and produce an object file; and
   a virtual machine coupled to the compiler arranged to execute the object file.

2. A computer system according to claim 1 wherein the preloader is further arranged to:
   rewrite the bytecode to a new bytecode which explicitly indicates that at least one of the class and the superclass requires execution of the static initializer when it is determined that the bytecode makes the active reference to the class which requires the execution of the static initializer.

3. A computer system according to claim 1 wherein the preloader is further arranged to:
   rewrite the bytecode to a new bytecode which indicates that at least one of the class and the superclass requires execution of the static initializer when it is determined that the bytecode makes the active reference to the class which has the superclass which requires the execution of the static initializer.

4. A computer system according to claim 1 wherein the preloader is further arranged to:
   rewrite the bytecode to a new bytecode which explicitly indicates that at least one of the class and the superclass requires execution of the static initializer when it is determined that the bytecode makes the active reference to the class which has the superclass which requires the execution of the static initializer.

5. A computer system comprising:
   a bytecode rewritter arranged to,
      determine whether a bytecode is associated with a scalar field or an object reference field,
      rewrite the bytecode to identify the bytecode as being associated with the scalar field when the bytecode is associated with the scalar field,
      rewrite the bytecode to identify the bytecode as being associated with the object reference field when the bytecode is associated with the object reference field, wherein
   the bytecode rewriter is associated with producing a source file;
   a compiler arranged to accept the source file as input and produce an object file; and
   a virtual machine arranged to execute the object file.

6. In a computer system having a preloader coupled to a compiler and a virtual machine, a method for rewriting bytecodes to minimize runtime checks, comprising:

by the preloader,
- determining whether a bytecode makes an active reference to a class which requires an execution of a static initializer;
- determining if the class has a superclass which requires the execution of the static initializer, wherein the preloader produces a source file,
- rewriting the bytecode to a new bytecode, by the preloader, which indicates that at least one of the class and the superclass requires execution of the static initializer when it is determined that the bytecode makes the active reference to the class which requires the execution of the static initializer;

accepting the source file as input and produce an object file by the compiler; and executing the object file by the virtual machine.

7. A method according to claim 6, further comprising:
rewriting the bytecode to a new bytecode, by the preloader, which explicitly indicates that at least one of the class and the superclass requires execution of the static initializer when it is determined that the bytecode makes the active reference to the class which requires the execution of the static initializer.

8. A method according to claim 6 further comprising:
rewriting the bytecode to a new bytecode, by the preloader, which indicates that at least one of the class and the superclass requires execution of the static initializer when it is determined that the bytecode makes the active reference to the class which has the superclass which requires the execution of the static initializer.

9. A method according to claim 6, further comprising:
rewriting the bytecode to a new bytecode, by the preloader, which explicitly indicates that at least one of the class and the superclass requires execution of the static initializer when it is determined that the bytecode makes the active reference to the class which has the superclass which requires the execution of the static initializer.

10. A computer program product for rewriting bytecodes to minimize runtime checks in a computer system having a preloader coupled to a compiler and a virtual machine, comprising:

computer code for determining whether a bytecode makes an active reference to a class which requires an execution of a static initializer;

computer code for determining if the class has a superclass which requires the execution of the static initializer, wherein the preloader produces a source file;

computer code for rewriting the bytecode to a new bytecode, by the preloader, which indicates that at least one of the class and the superclass requires execution of the static initializer when it is determined that the bytecode makes the active reference to the class which requires the execution of the static initializer;

computer code for accepting the source file as input and produce an object file by the compiler;

computer code for executing the object file by the virtual machine; and a computer readable medium for storing the computer program product.

11. A computer program product according to claim 10, further comprising:
computer code for rewriting the bytecode to a new bytecode, by the preloader, which explicitly indicates that at least one of the class and the superclass requires execution of the static initializer when it is determined that the bytecode makes the active reference to the class which requires the execution of the static initializer.

12. A computer program product according to claim 10 further comprising:
computer code for rewriting the bytecode to a new bytecode, by the preloader, which indicates that at least one of the class and the superclass requires execution of the static initializer when it is determined that the bytecode makes the active reference to the class which has the superclass which requires the execution of the static initializer.

13. A computer program product according to claim 10, further comprising:
computer code for rewriting the bytecode to a new bytecode, by the preloader, which explicitly indicates that at least one of the class and the superclass requires execution of the static initializer when it is determined that the bytecode makes the active reference to the class which has the superclass which requires the execution of the static initializer.

* * * * *